United States Patent Office 3,475,316
Patented Oct. 28, 1969

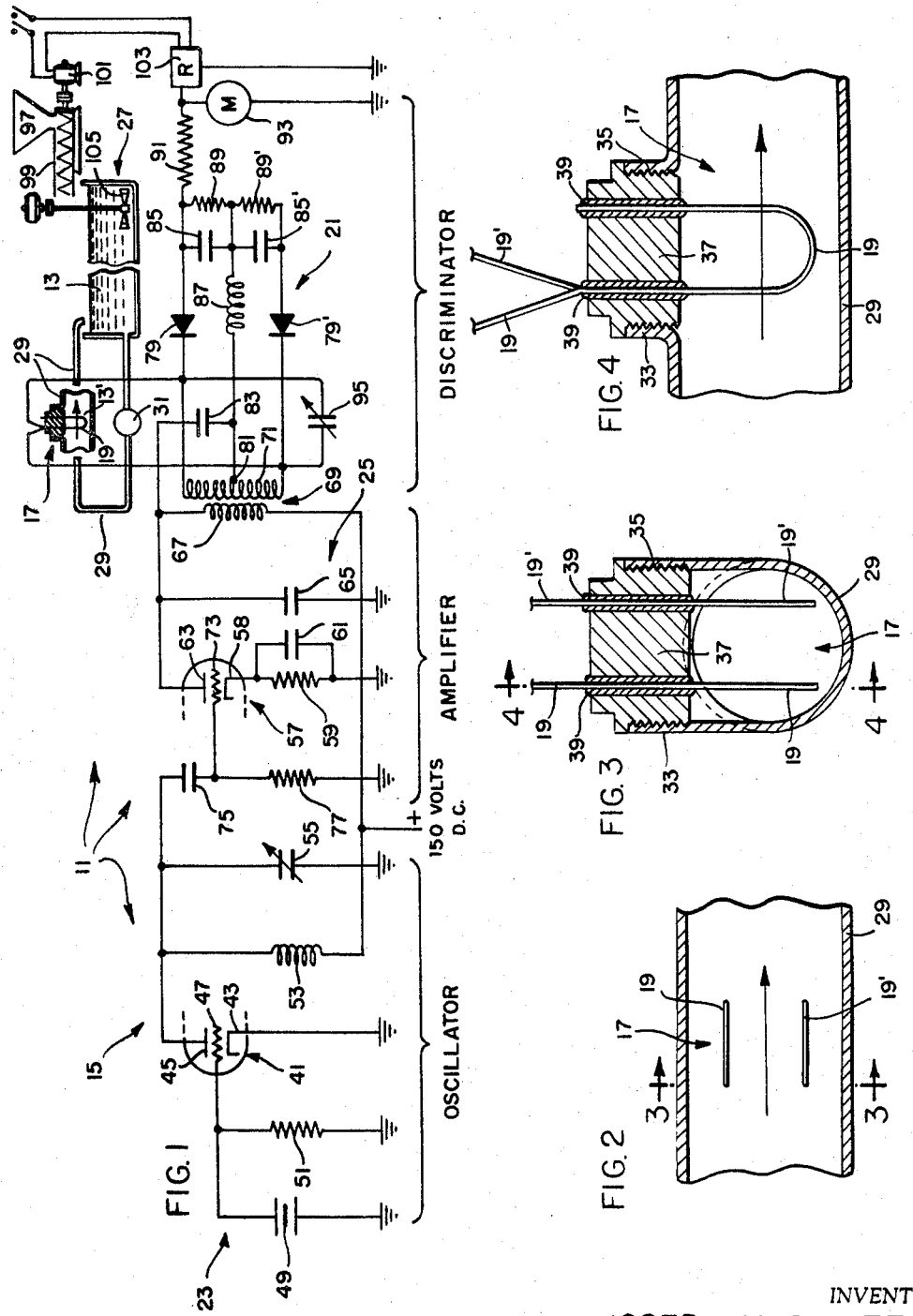

3,475,316
APPARATUS FOR MEASUREMENT AND CONTROL OF NONVOLATILE COMPONENTS IN LIQUID COATING COMPOSITIONS
Joseph M. De Vittorio, Homewood, Ill., assignor to The Sherwin-Williams Company, Cleveland, Ohio, a corporation of Ohio
Filed June 29, 1965, Ser. No. 467,919
Int. Cl. B01k 5/00; G05b 13/02; C23b 13/00
U.S. Cl. 204—299                                     8 Claims

ABSTRACT OF THE DISCLOSURE

The nonvolatile matter, for example, pigments and resinous binders in liquid coating compositions, especially aqueous paint baths used in the electrodeposition of paints, is measured and the concentration of the bath is controlled by means of an apparatus in which the sample of the liquid coating composition is passed between a pair of spaced electrically insulated test electrodes and an electric signal is applied as a stimulus between said electrodes and the dielectric response of the sample to such stimulus is measured. The signal preferably comprises radio frequency impulses. A response is used to operate the apparatus to control the concentration of the coating composition.

---

The present invention relates in general to an improved means and a method of quantitatively measuring and controlling the amount of nonvolatile matter in a liquid, for instance, solid materials or nonvolatile liquid contained in a liquid vehicle such as, for example, the solid components of paint; a further object being to provide for continuously measuring or monitoring the constituents of a paint bath in which articles to be coated with paint may be immersed.

The term "nonvolatile matter" (NVM), as defined herein, means material which does not volatilize when heated at 400° F. for thirty minutes.

A recent development in the art of applying or coating pigmentatious and other material upon objects to be coated, including, more particularly, the bodies of automotive vehicles, has been the provision of means for applying the coating material by electrodeposition from a bath comprising the solid pigmentatious material and a resinous binder to be deposited and a liquid carrier in which the material forms a suspension or solution and from which the material to be coated is deposited by electrolytic action. In such an arrangement, it will be obvious, that the bath in which electrodeposition takes place will progressively lose its nonvolatile constituents as the same are deposited upon the object being coated, unless means are provided for replenishing the bath with material to replace that withdrawn from the bath and applied upon the objects being coated. It is especially true, in the interests of uniformity of application of material coated electrolytically from baths of the character mentioned, that the bath should at all times be maintained as precisely as possible with a constant concentration therein of material to be coated; and that means should desirably be provided for constantly measuring the concentration of coating materials in the bath and to supply additional coating material in the bath to maintain the same at a desired concentration.

An important object of the present invention is to provide electrical equipment for measuring and controlling the concentration of nonvolatile matter in a liquid vehicle; a further object being to provide for continuously monitoring a suspension or solution, including baths for the electrolytic deposition therefrom of coating material, so as to permit coating material to be added to the bath in order to maintain at a constant level the concentration of solid material in the bath; a further object being to provide for supplying nonvolatile coating material in an electrolytic coating bath to thereby permit the coating of material to take place from a bath of constant concentration.

Another important object is to provide for using high frequency electronic equipment for detecting changes in concentration of nonvolatile materials in a liquid carrier therefor; a further object being specifically to provide high frequency measurement of solids in an electrolytic coating bath of the sort now commonly employed in applying pigmentatious material upon objects such as, for example, automobile bodies.

Another important object is to provide monitoring equipment of the character mentioned comprising a high frequency signal generator, means to apply such high frequency signal upon a probe immersed in the liquid to be tested and means to measure the frequency response of the liquid; a further object being to employ a test probe comprising a pair of spaced apart electrical conductors in the environment mentioned; a still further object being to employ a pair of identical loops, of varnish insulated wire supported in parallel spaced apart planes in a conduit through which the liquid to be tested is caused to pass in a direction between and parallel with respect to the spaced loops.

A further object is to employ an oscillator controlled by a crystal in the plate circuit of a triode, wherein the circuit parameters provide a relatively high quality or Q value, being the ratio of the inductive reactance of the circuit to its resistance; a further object being to employ a tuned discriminator circuit or system connected with the test probe in order to determine the dielectric constant of the sample under test between the loops of the test probe, which varies with the amount of nonvolatile material in the liquid.

Another important object is to employ a microammeter for indicating variable voltage produced in the discriminator as a function of the dielectric constant of the sample to thereby indicate variation in the amount of material present in the sample, in terms of voltage indicated on the microammeter.

A further object is to provide a method and apparatus for determining the dielectric property of liquids.

The foregoing and numerous other important objects, advantages and inherent functions will become apparent as the same is more fully understood from the following description which, taken in conjunction with the accompanying drawings, discloses a preferred embodiment of the invention.

Referring to the drawings:

FIG. 1 is a diagrammatic showing of electrical circuitry and components forming an electrical system for monitoring the solid or nonvolatile constituents in a liquid carrier of the same, in accordance with the teachings of the present invention;

FIG. 2 is a sectional view taken through a test conduit in which a liquid to be tested is caused to flow between spaced conductors of the test probe which forms a component of the equipment shown in FIG. 1;

FIGS. 3 and 4 are sectional views respectively taken substantially along the lines 3—3, in FIG. 2, and 4—4, in FIG. 3.

To illustrate the invention, the drawings show a system 11 for determining and controlling the dielectric quality and the proportion of nonvolatile matter carried in a liquid 13. More particularly, the system 11 embodies electrical circuitry 15 for measuring the dielectric constant of a test sample 13' of the liquid, since the dielectric constant of a liquid varies as a function of the amount of nonvolatile material contained therein.

As shown, the circuitry 15 may comprise a pair of spaced apart testing electrodes 19, 19', a discriminator circuit 21 for measuring the dielectric constant of the test sample 13' disposed between the electrodes 19, 19', an oscillator 23 and an associated amplifier 25, for driving the discriminator.

Any suitable means, of course, may be employed for obtaining a test sample of the liquid to be tested and for applying it in position to be tested at a testing station 17. To this end, in addition to the circuitry 15, the system 11 may comprise a bath 27, containing the liquid to be tested 13 and an electrically nonconducting conduit 29, through which a portion of said liquid may be continuously delivered, as by means of a circulating pump 31 connected in the conduit 29, from a selected area or zone of the bath, to and through the testing station 17, and returned thence to the bath 27. Obviously, a sample of the liquid for test purposes, could be selected otherwise than by a continuous recirculation of portions of the liquid through the testing station; but such arrangement is preferred since it permits the liquid to be continuously sampled and monitored for the immediate detection of any charge in the concentration of solids or other non-volatile matter therein.

Even though the bath itself has an applied electromotive force in order to cause deposition of a paint, the length and diameter of the electrically nonconducting tube which connects the bath to the monitoring device is such that electrical charge on the bath does not affect the operation of the monitoring device.

The conduit 29, at the monitoring station 17 may comprise a tube of transparent plastic formed with a lateral opening defined by a cylindrical portion 33 integrally connected with the conduit and formed with internal screw threads 35 for threaded connection with a closure nut 37. The electrodes 19, 19' may conveniently be and preferably are arranged as identical loops of varnish coated wire having diameter of the order of 40 mils (0.040 inch), said loops having opposite ends sealingly mounted in insulated channels formed through the nut 37, at least one arm of each loop extending through and outwardly of the outer side of the nut for electrical connection with the discriminator 21. The electrodes 19, 19' can be insulated or non-insulated depending upon the conductivity of the test sample. For the purpose of monitoring paint baths in paint electrodeposition systems they should be insulated.

The oscillator 23 may conveniently comprise a triode tube 41 having a grounded cathode 43, an anode 45 connected with the amplifier 25, and a control grid 47 connected to ground through a crystal 49 and a grid leak bias resistor 51, the anode or plate 45 being connected to a source of D.C. potential of the order of 150 volts, through an inductor 53 and an adjustable capacitor 55 in parallel with the inductor.

The amplifier 25 may conveniently comprise a triode 57 having a cathode 58 connected to ground through a cathode bias resistor 59 connected in parallel with a bypass condenser 61 for eliminating alternating current degeneration which would take place in the absence of the capacitor. The triode 57 has an anode 63 which is connected to ground through a capacitor 65 and to a suitable source of D.C. potential of the order of 150 volts through the primary winding 67 of a coupling transformer 69, the secondary winding 71 of which serves as the input for the discriminator 21, the control grid 73 of the triode 57 being coupled with the anode 45 of the triode 41 through a capacitor 75, the control grid 73 being also grounded through a resistor 77.

The discriminator 21 comprises a pair of rectifiers 79, 79', respectively, connected with the opposite ends of the secondary winding 71 of the coupling transformer, said secondary winding having a center tap 81 connected with the anode or plate 63 of the amplifying triode 57 through a capacitor 83. The transformer remote sides of the rectifiers 79, 79' respectively are connected with the center tap 81 each through a corresponding capacitor 85, 85' and a common inductor 87, each capacitor 85, 85' being connected in parallel with a corresponding resistor 89, 89'. The rectifier connected ends of one or other of the associated resistor-capacitor circuits may be connected to ground through a ballast resistor 91 and an indicating microammeter 93.

While separate triodes 41 and 57 may be employed, it is preferable that the same comprise the halves of a single 6BZ8 tube. The crystal 49 may be selected for operation at a desired frequency, satisfactory results being attainable at frequencies of the order of 27 megacycles. Satisfactory operation of the system 11 may be attained where the several components have the following values of resistance, inductance and capacitance: Resistor 51, 680 kilohms; inductor 53, 5 microhenrys; adjustable capacitor 55, 100 picofarads; resistor 59, 1 kilohm; capacitor 61, 470 picofarads; capacitor 65, 33 picofarads; capacitor 75, 200 picofarads; resistor 77, 1 megohm; the capacitors 83, 85, 85', each 33 picofarads; the inductor 87, 10 microhenrys; the resistors 89, 89', each 5 megohms; the tuning capacitor 95, 300 picofarads; the rectifiers 79, 79' preferably comprising 1N251 rectifiers.

The use of high frequency signals as a means of detecting changes in the proportion of finely divided solids in a suspension or solution such as an electrode deposition paint bath is of great value in that it permits continuous supervision of the solid contents of the bath. High frequency monitoring signals are generated in the oscillator 23, which acts as a high Q resonator operationg at a single frequency. The oscillator controlled by a crystal provides an electrical circuit having a substantially higher Q rating than can practically be obtained from any other coil and condenser combination. The plate circuit of the oscillator is tuned to the frequency of the crystal 49 by means of the adjustable capacitor 55. The capacitor 75 couples the oscillator with the amplifier wherein the resistor 77 forms a grid leak of high value to reduce the loading effect on the oscillator. Tests have revealed that, in order to get maximum changes in the coil 71, frequencies in excess of 1 megacycle should be employed, and the sensing element must have a high Q value, that is to say, the capacitive reactance of the electrode sensor 19, 19' must be relatively large as compared with its resistance.

The primary winding 67 of the transformer 69 acts as the plate load on the amplifier, and the transformer itself serves to couple the output of the amplifier with the discriminator. The combination of the winding 67 as an inductor and the condenser 65 are tuned to the frequency of the oscillator in order to obtain optimum gain in the amplifier, and the secondary winding 71 of the transformer is part of a standard frequency modulation discriminator, that is to say, a circuit in which the output voltage is proportional to variations in impressed frequency. The signal applied in the discriminator is rectified by the diodes 79, 79' and is proportional to the difference between the input frequency of the signal as delivered through the transformer 69 and the frequency to which the secondary 71 of the transformer 69 is tuned by the combination of the adjustable capacitor 95 and the equivalent capacitor comprising the spaced electrodes 19, 19' and the intervening test sample 13'. By adjusting the capacitor 95 to give a peak readout the secondary winding of the transformer will be tuned to the same frequency as that of the primary winding. If, however, the capacitance value at the electrodes 19, 19' or of the capacitor 95 were to change, the tuning change would untune the transformer secondary and produce a voltage drop at the readout end of the system, that is to say, at the meter 93. By adjusting the capacitor 95 in the range of greatest sensitivity, a change in either direction at the test electrodes 19, 19' can be read on the meter 93.

The system of the present invention operates in the manner intended because all matter is composed of a positive atomic nucleus surrounded by negative electron clouds. When placed in an electrical field, the electrons are displaced slightly with respect to the nucleus and an induced dipole moment results. Such dipole moment produces a state of electronic polarization in the materials. When atoms of unlike types combine to form molecules, shared electrons are not distributed symmetrically between the combining entities. As a consequence, the resulting electron clouds will be displaced toward the stronger binding atoms. This results in the production of charges of opposite polarity in the atoms. When an external fields acts on these charges, the equilibrium position of the atoms will be changed. The displacement of charged atoms or atom groups with respect to each other results in the development of a second kind of induced dipole, representing the atomic polarization of the dielectric. The asymmetric charge distribution between unlike partners of a molecule gives rise to permanent dipole moments which exist in the absence of an electric field. Such moments experience torque in an applied electrical field that tends to align them in the direction of the field. Such alignment results in an orientation polarization of the molecule. The above mentioned mechanisms of polarization are in fact due to charges that are locally bound in the atoms, in molecules, or in the actual structures of solids and liquids. Another mechanism of polarization that exists results from impeding the movement of charge carriers because of their entrapment either in the molecular material, or at the interfaces of the molecular material. Results of such entrapment is the prevention of discharge or of replacement of the carriers at the electrodes. This condition manifests itself in the generation of space charges and distortion of the electrical field, such distortion taking the form of increased capacitance in the sample.

It will be seen from the foregoing that the discriminator 21 comprises a frequency modulation ratio detector which converts frequency modulated signals to unmodulated audio frequency. In the arrangement shown no audio modulation takes place, but a change in either the input frequency or the frequency to which the discriminator is tuned will produce a corresponding direct current voltage change at the output end of the discriminator and indicated by the meter M(93).

Where the liquid to be tested 13 is of the type forming an electrolytic paint depositing bath of the sort now in common use in painting and undercoating vehicle bodies and other electrically conductive objects, it is desirable, in the interests of uniformity of paint deposition, to maintain, at a uniform level, the concentration of coating material in the bath. To this end, means, controlled by the voltage fluctuations produced at the output end of the discriminator, may be provided for controlling the operation of material adding means, which, as shown, may conveniently comprise a supply source or hopper 97 and screw delivery mechanism 99, driven as by means of a preferably electric motor 101, to deliver material from the supply source 97 into the bath 27 continuously so long as the motor 101 is enenrgized. The motor 101 may be energized from a suitable source of electrical power under the control of relay means in turn controlled by the output of the discriminator so that the motor 101 may be energized for the addition of material in the bath 27 whenever the signal produced at the output end of the discriminator 21 indicates a deficiency of coating material in the bath 13. If desired, motor driven mixing means, such as the paddle wheel 105 may be provided in the vessel 27 to promote uniform distribution of added solids rapidly.

As previously indicated, the invention can be employed for determining the dielectric constant of a given liquid. Thus, the meter 93 can be calibrated to read the dielectric constant directly. The invention is especially important, however, when employed for the purpose of maintaining a given concentration of non-volatile matter by monitoring the change in dielectric quality of a given liquid, such as, for example, a bath used for the electrodeposition of paint.

The following example illustrates the practical application of the invention in controlling the solids content of a bath employed for the electrodeposition of paint.

EXAMPLE

The paint used has the following composition:

| Ingredients: | Parts by wt. |
|---|---|
| Water soluble acrylic resin (butyl acrylate-stryrene-methacrylic acid polymer solution in water 90% solids) | 118.4 |
| Iron oxide pigment | 19.7 |
| Ethylene glycol monobutylether | 11.8 |
| Melamine resin (Cymel 300) | 28.2 |
| Distilled water | 695 |

This composition is employed with an electroplating bath for depositing paint on ferrous metal surfaces. The bath is operated at a temperature of 77° F. with a current density of 2.5 amperes per square foot. 881.3 pounds of the aforesaid composition produces 102.8 gallons of bath.

The bath is connected to a monitoring device of the type herein described through a nonelectrically conducting plastic tube ¼ inch in inner diameter by 48 inches long.

Meter readings for various solids contents are as follows:

| Percent solids by weight: | Current in microamperes |
|---|---|
| 15 | 4.15 |
| 14 | 4.5 |
| 13 | 4.9 |
| 12 | 5.3 |
| 11 | 5.85 |
| 10 | 6.3 |
| 9 | 6.9 |
| 8 | 7.55 |
| 7 | 8.2 |
| 6 | 8.95 |
| 5 | 9.75 |

As shown by the above table, the peak reading at 15% solids is 4.15 microamperes. The solids content of the bath will not ordinarily exceed 15% unless the bath is subjected to evaporation in which case the meter current will be less than 4.15 microamperes. In normal continuous operation, however, as the paint solids are deposited from the bath onto the object to be painted, or plated, the meter reading will increase which in turn means that the solids content of the bath is decreasing. The amount of solids required to replenish the bath can readily be determined from the meter reading. Ordinarily, the bath is not allowed to drop more than 2 or 3% in solids content before being replenished and it is preferable to have the meter or other indicating device connected to suitable operating means in order automatically to maintain the solids content of the bath substantially at 15%. The addition of the necessary solids can be either intermittent or continuous.

In a small cell having a capacity of 5 gallons of the paint composition and adapted to electrodeposit a coating of one mil thickness on 50 to 75 square feet of steel at a rate of four square feet per minute, additions or solids are required after about 10 to 15 minutes of operation in order to maintain a desirable electrolyte composition. Similar considerations apply to larger scale operations. The invention therefore makes it possible to maintain a nonvolatile matter content of an electrodeposition bath by monitoring the change in dielectric quality of the bath.

It is thought that the invention and its numerous attendant advantages will be fully understood from the foregoing description, and it is obvious that numerous changes may be made in the form, construction and arrangement of the several parts of the disclosed apparatus without departing from the spirit or scope of the invention, or sacrificing any of its attendant advantages, the form herein disclosed being a preferred embodiment selected for the purpose of demonstrating the invention.

The invention is hereby claimed as follows:

1. Coating apparatus comprising a tank for containing a coating bath of nonvolatile coating material in a liquid carrier, charging means for supplying liquid carrier and said coating material to the bath in said tank, and electrical monitoring means comprising a pair of spaced electrically insulated test electrodes for continuously measuring the proportion of coating material in the carrier and for actuating the charging means to supply additional coating material in the tank from time to time to maintain the concentration of coating material within prescribed limits.

2. Coating apparatus comprising a tank for containing a coating bath of nonvolatile coating material in a liquid carrier, charging means for supplying liquid carrier and said coating material to the bath in said tank, and electrical monitoring means comprising a pair of spaced electrically insulated test electrodes operative in response to the dielectric quality of the bath for continuously measuring the proportion of coating material in the carrier and for actuating the charging means to supply additional coating material in the tank from time to time to maintain the concentration of coating material within prescribed limits.

3. Coating apparatus as set forth in claim 1, including mechanically operable motor driven means for delivering non-volatile coating material into the tank, and relay means controlled by said monitoring means for actuating said motor driven material delivering means.

4. Coating apparatus as set forth in claim 1, wherein the monitoring means comprises a pair of spaced electrically insulated conductor forming test electrodes, means forming a conduit containing the electrodes, means to deliver sample portions of the bath continuously from the bath between the electrodes, a discriminator connected with said test electrodes and with said relay, means to apply electrical signal impulses on said discriminator, and means to tune the discriminator to a desired response whereby changes of predetermined magnitude in the dielectric value of the bath will actuate the relay.

5. In an apparatus wherein a paint coating is electrodeposited from an electrodeposition bath in which an electrical potential is maintained between said bath and an object to be coated, electrical monitoring means comprising a pair of spaced electrically insulated electrodes for measuring the concentration of paint coating material in said bath and a tube of electrically nonconducting material adapted to be connected between said bath and said electrical monitoring means, said tube being of such diameter and length that the electrical potential on said bath will not be transmitted to said electrical monitoring means.

6. In an apparatus wherein a paint coating is electrodeposited from an electrodeposition bath in which an electrical potential is maintained between said bath and an object to be coated, charging means for supplying liquid carrier and paint coating material to said bath, and electrical monitoring means comprising a pair of spaced electrically insulated test electrodes for continuously measuring the concentration of paint coating material in said bath and for actuating the charging means to supply additional paint coating material to said bath from time to time to maintain a concentration of coating material within prescribed limits.

7. An apparatus as claimed in claim 6 in which said electrical monitoring means is adapted to be connected to said bath by a tube which is electrically nonconducting and provides a passageway for continuous removal of a portion of said bath to said electrical monitoring means, said tube being of such diameter and length that said electrical monitoring means will be substantially unaffected by the electrical potential on said bath.

8. In an apparatus wherein a paint coating is electrodeposited from an electrodeposition bath, electrical monitoring means for continuously measuring the concentration of paint coating material in said bath, said monitoring means comprising a pair of spaced electrically insulated conductors forming test electrodes, means forming a conduit containing said electrodes, means to deliver sample portions of the bath between said electrodes, a discriminator connected to said test electrodes, an indicating device connected to said discriminator, means to apply electrical signal impulses on said discriminator, and means to tune the discriminator to a desired response whereby changes of predetermined magnitude in the dielectric value of the bath will actuate said indicating device.

References Cited

UNITED STATES PATENTS

| 2,985,826 | 5/1961 | Fluegel | 324—61 |
| 3,231,815 | 1/1966 | Spencer | 324—61 |
| 3,253,606 | 5/1966 | Kuntz | 324—61 |
| 3,300,716 | 1/1967 | Engert | 324—61 |
| 3,355,373 | 11/1967 | Brewer et al. | 204—181 |

JOHN H. MACK, Primary Examiner

E. ZAGARELLA, Jr., Assistant Examiner

U.S. Cl. X.R.

118—7; 204—181; 324—61